(12) United States Patent
Park et al.

(10) Patent No.: US 11,761,713 B2
(45) Date of Patent: Sep. 19, 2023

(54) HEAT CONDUCTION FIN AND SOLID STATE HYDROGEN STORAGE DEVICE HAVING SAME

(71) Applicants: Hyundai Motor Company, Seoul (KR); KIA Motors Corporation, Seoul (KR)

(72) Inventors: Ji Hye Park, Seoul (KR); Kyung Moon Lee, Uiwang-si (KR); Jun Seok Seo, Gunpo-si (KR); Hoon Mo Park, Seongnam-si (KR); Dong Hoon Nam, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 923 days.

(21) Appl. No.: 16/539,325

(22) Filed: Aug. 13, 2019

(65) Prior Publication Data

US 2020/0263936 A1 Aug. 20, 2020

(30) Foreign Application Priority Data

Feb. 18, 2019 (KR) .................. 10-2019-0018420

(51) Int. Cl.
*F28F 1/32* (2006.01)
*C01B 3/00* (2006.01)
*F17C 11/00* (2006.01)

(52) U.S. Cl.
CPC .............. *F28F 1/325* (2013.01); *C01B 3/001* (2013.01); *F17C 11/005* (2013.01)

(58) Field of Classification Search
CPC ........ F28F 1/325; C01B 3/001; C01B 3/0026; F17C 11/005; F17C 13/00; F17C 2221/012; F17C 2225/0123; Y02E 60/32
See application file for complete search history.

(56) References Cited

U.S. PATENT DOCUMENTS 8,636,836 B2    1/2014   Mudawar et al.
8,748,052 B2    6/2014   Irvine et al.
(Continued)

FOREIGN PATENT DOCUMENTS

CN    102401233 A    4/2012
DE    102016224141 A1   7/2017
(Continued)

OTHER PUBLICATIONS

Visaria et al. "Enhanced heat exchanger design for hydrogen storage using high-pressure metal hydride: Part 1. Design methodology and computational results", International Journal of Heat and Mass Transfer 54 (2011) 413-423 (Year: 2011).*

(Continued)

*Primary Examiner* — Steven J Bos
*Assistant Examiner* — Syed T Iqbal
(74) *Attorney, Agent, or Firm* — LEMPIA SUMMERFIELD KATZ LLC

(57) ABSTRACT

Disclosed is a solid state hydrogen storage device, capable of providing a weight reduction of a hydrogen storage system while inhibiting heat conduction performance from being degraded, and also of increasing hydrogen storage capacity. The present disclosure provides a heat conduction fin including multiple tube passing holes through which the heat exchange tube passes and linear-shaped connecting portions connecting the tube passing holes to each other, and a solid state hydrogen storage device having the same.

9 Claims, 3 Drawing Sheets

(56) References Cited

U.S. PATENT DOCUMENTS

| | | | |
|---|---|---|---|
| 10,511,039 B2 | 12/2019 | Park et al. | |
| 2011/0284184 A1* | 11/2011 | Mudawar | C01B 3/0031 165/104.19 |
| 2017/0214067 A1 | 7/2017 | Park et al. | |

FOREIGN PATENT DOCUMENTS

| | | |
|---|---|---|
| JP | 4183959 B2 | 11/2008 |
| JP | 2012516984 A | 7/2012 |
| JP | 6061354 B2 | 1/2017 |
| KR | 20170011161 A | 2/2017 |

OTHER PUBLICATIONS

Office Action cited in Chinese patent application No. 201910822458.8.
Office Action cited in Japanese patent application No. 2019-148629.
Notice of Allowance cited in Chinese patent application No. 201910822458.8; dated Jun. 26, 2023; 6 pp.

* cited by examiner

HEAT CONDUCTION FIN AND SOLID STATE HYDROGEN STORAGE DEVICE HAVING SAME

CROSS REFERENCE TO RELATED APPLICATION

The present application claims priority to Korean Patent Application No. 10-2019-0018420, filed Feb. 18, 2019, the entire contents of which is incorporated herein for all purposes by this reference.

FIELD

The present disclosure relates to a heat conduction fin and a solid state hydrogen storage device having the same, in which a weight reduction of a hydrogen storage system is provided while inhibiting heat conduction performance of the heat conduction fin from being degraded, and also hydrogen storage capacity is increased.

BACKGROUND

The statements in this section merely provide background information related to the present disclosure and may not constitute prior art.

In general, a solid state hydrogen storage material based on a metal hydride undergoes the reversible reactions in which hydrogen molecules dissociate from the metal hydride into hydrogen atoms in the presence of heat energy, thus releasing hydrogen, and the hydrogen recombines with the metal under appropriate temperature and hydrogen pressure, thus storing hydrogen.

$MgH_2$ is one of representative metal hydrides having high hydrogen storage capacity per unit mass. For example, $MgH_2$ may have a hydrogen storage density of 7.8 wt %.

However, a metal hydride such as $MgH_2$ has a high temperature at which the hydrogen release reaction takes place and the power consumption for heating is high.

The foregoing is intended merely to aid in the understanding of the background of the present disclosure, and is not intended to mean that the present disclosure falls within the purview of the related art that is already known to those skilled in the art.

SUMMARY

The present disclosure provides a heat conduction fin and a solid state hydrogen storage device having the same, in which a weight reduction of a hydrogen storage system is provided while inhibiting heat conduction performance of the heat conduction fin from being degraded, and also hydrogen storage capacity is increased.

According to one aspect of the present disclosure, there is provided a heat conduction fin of a solid state hydrogen storage device, the heat conduction fin including: multiple tube passing holes through which heat exchange tubes pass; and linear-shaped connecting portions connecting the tube passing holes to each other.

The connecting portions that connect the tube passing holes to each other may form closed spaces defined between the connecting portions.

The heat conduction fin may be disposed between hydrogen storage materials; and the hydrogen storage materials are provided in the closed spaces.

The connecting portions may be connected between adjacent tube passing holes in a linear or a curved shape.

Ends of the connecting portions may be integrally secured to outer circumferential edges of the tube passing holes.

One of the connecting portions and another one of the connecting portions may intersect each other such that the connecting portions are integrally secured to each other.

The tube passing holes and the connecting portions may be provided on the same horizontal plane.

The tube passing holes and the connecting portions may have the same thickness.

The heat conduction fin may further include an annular-shaped connecting ring portion provided at an edge of the heat conduction fin, wherein the connecting portions may be connected to an inner circumferential surface of the connecting ring portion.

The heat conduction fin may further include a hydrogen injection portion provided at a center of the heat conduction fin, wherein the connecting portions may be connected to an outer circumferential surface of the hydrogen injection portion.

According to another aspect of the present disclosure, there is provided a solid state hydrogen storage device, including: multiple hydrogen storage materials provided in a storage container and configured to store and release hydrogen; heat exchange tubes passing through the hydrogen storage materials and supplying heat; and a heat conduction fin provided between the hydrogen storage materials, and including multiple tube passing holes through which the heat exchange tubes pass and linear-shaped connecting portions connecting the tube passing holes to each other.

According to the present disclosure, through provision of the tube passing holes connected to each other by the linear-shaped connecting portions, and provision of the connecting portions connected between the tube passing holes to form a net structure, it is possible to reduce the weight of the heat conduction fin, thus providing a weight reduction of a hydrogen storage system. Additionally, a hydrogen storage material is provided in the empty spaces formed in the heat conduction fin, making it possible to increase the amount of the hydrogen storage material in the hydrogen storage system and thus improve weight storage efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
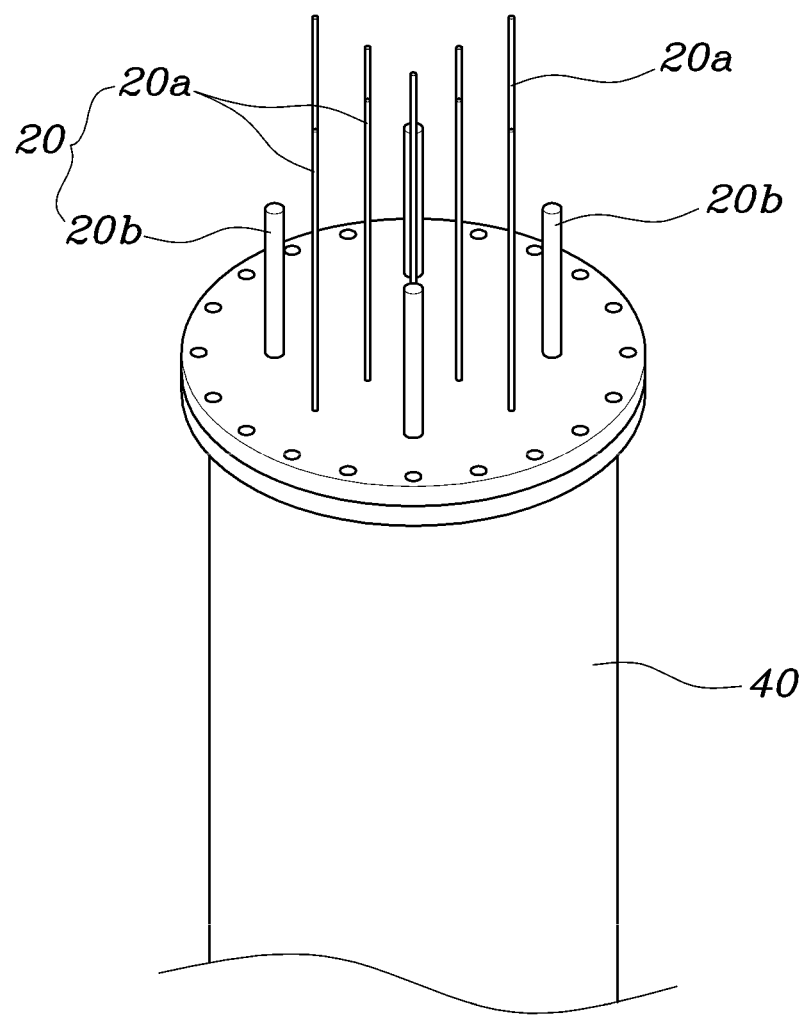
FIG. 1 is a view illustrating the shape of a storage container of a solid state hydrogen storage device according to an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, an aspect of the present disclosure will be described in detail with reference to the accompanying drawings. Throughout the drawings, the same reference numerals will refer to the same or like parts.

Figure 2:
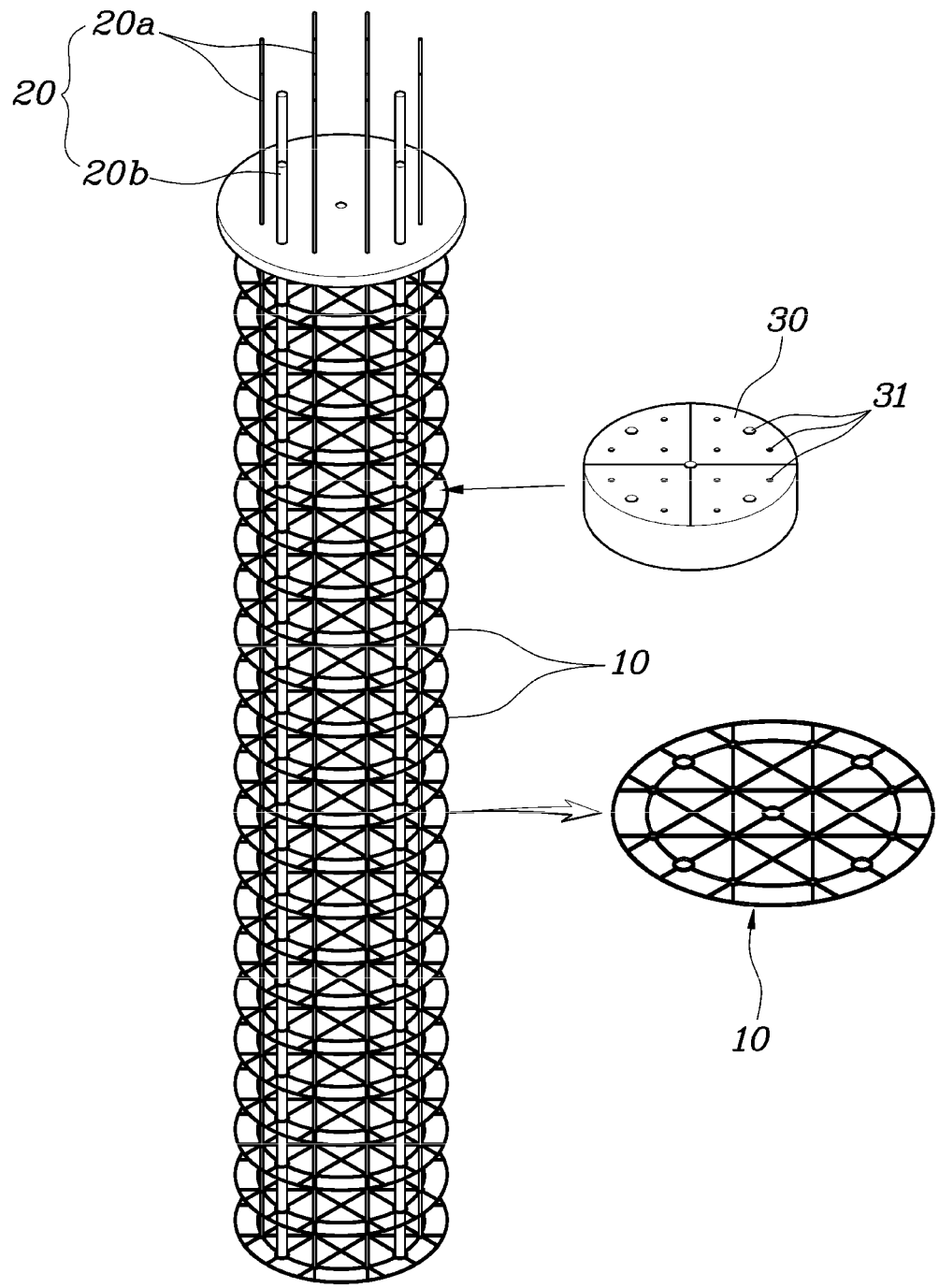
FIG. 2 is a view illustrating a coupling relationship between a heat exchange tube, a heat conduction fin, and a hydrogen storage material according to the aspect of the present disclosure.

Referring to FIGS. 1 and 2, a solid state hydrogen storage device according to an aspect of the present disclosure will be described. The solid state hydrogen storage device includes a cylindrical storage container 40 and multiple heat exchange tubes 20 provided in the storage container along the axial direction thereof.

Here, each of the heat exchange tubes 20 includes a heating tube 20a and a cooling tube 20b that are made of a metal material. Multiple heating tubes 20a and multiple cooling tubes 20b are provided at regular angular intervals at arbitrary radial positions around the axis of the storage container 40.

Additionally, the hydrogen storage material 30 that stores and releases hydrogen is a metal hydride such as $MgH_2$, $NaAlH_4$, or the like and multiple disc-shaped hydrogen storage materials 40 are provided in the storage container 40. Herein, each of the hydrogen storage materials 30 has a through hole 31 formed at a position corresponding to each of the heat exchange tubes 20 such that the heat exchange tubes 20 pass through the through holes 31, whereby heat is supplied to the hydrogen storage materials from the heat exchange tubes 20.

Furthermore, a heat conduction fin 10 having excellent heat conduction performance is provided between two adjacent hydrogen storage materials 30 so as to improve conduction of heat to be transferred to the hydrogen storage materials 30 from the heat exchange tubes 20.

To this end, the heat conduction fin 10 according to the present disclosure is configured such that a tube passing hole 11 is formed at a position corresponding to each of the heat exchange tubes 20 such that the heat exchange tubes 20 pass through the tube passing holes, and the tube passing holes 11 are connected to each other by linear-shaped connecting portions 13.

Thus, the connecting portions 13 that connect the tube passing holes 11 to each other form closed spaces 13 defined between the connecting portions 13.

In other words, in the related art, the heat conduction fin 10 for transferring heat of the tube passing holes 11 has a planar disc shape. In the present disclosure, however, the tube passing holes 11 are connected to each other by the linear-shaped connecting portions 13, and the spaces formed between the connecting portions 13 are empty spaces. This makes it possible to reduce the weight of the heat conduction fin 10 while inhibiting heat conduction performance thereof from being degraded.

Additionally, in the present disclosure, the hydrogen storage materials 30 are provided in the closed spaces S.

In other words, the hydrogen storage materials 30 are provided in the empty spaces formed in the heat conduction fin 10, whereby the amount of the hydrogen storage materials 30 are increased in a hydrogen storage system, and thus hydrogen storage capacity is increased.

Figure 3:
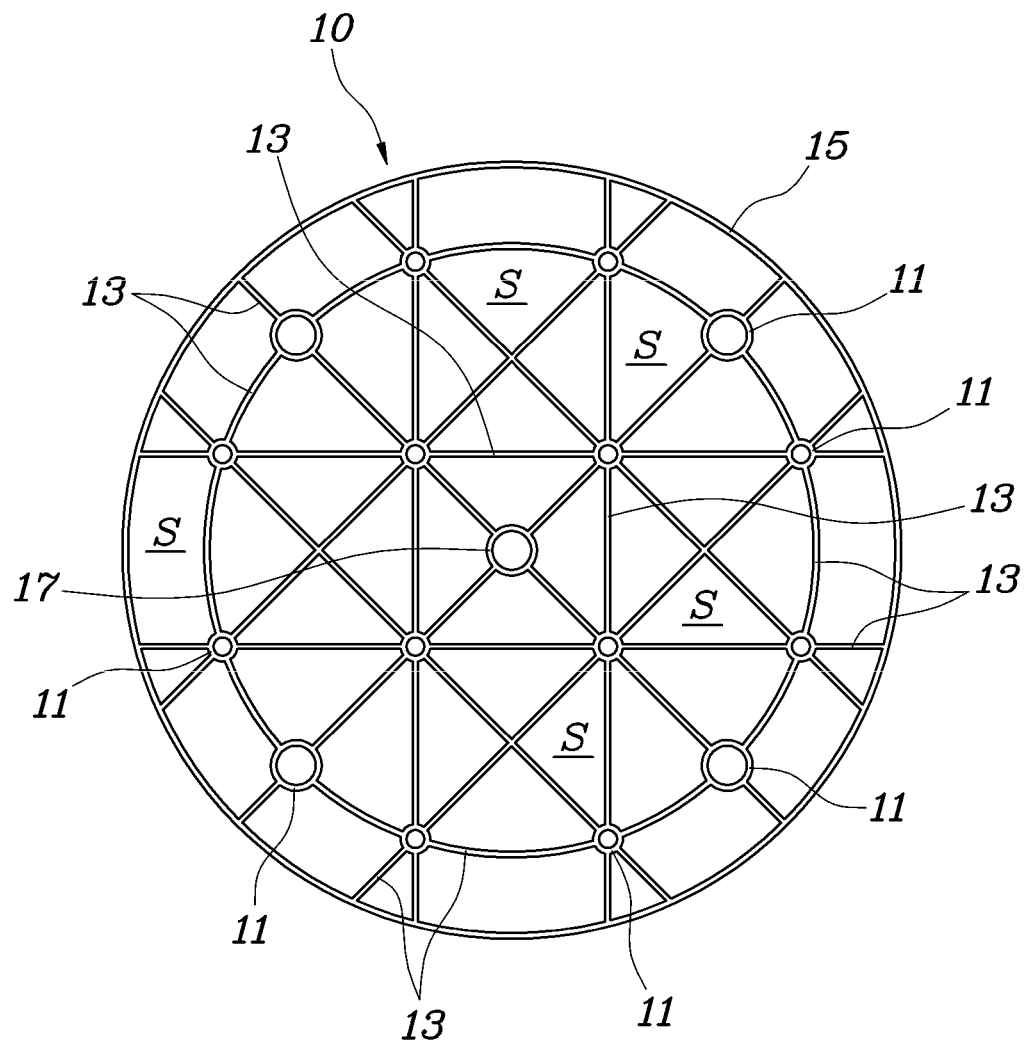
FIG. 3 is a view illustrating a structure of the heat conduction fin according to the aspect of the present disclosure.

Meanwhile, referring to FIG. 3, a structure in which the tube passing holes 11 and the connecting portions 13 are connected to each other will be described. The connecting portions 13 are connected between adjacent tube passing holes 11 in a linear or a curved shape.

In other words, the tube passing holes 11 provided at the same radial position with respect to the center of the heat conduction fin 10 are connected to each other by the connecting portions 13 having a curved shape, and the tube passing holes 11 provided along the radial direction are connected to each other by the connecting portions having a linear shape. Furthermore, adjacent tube passing holes 11 are connected to each other by the linear-shaped connecting portions 13.

Additionally, ends of the connecting portions 13 are integrally secured to the outer circumferential edges of the tube passing holes 11.

In other words, when a first end of each of the connecting portions 13 is integrally secured to the outer circumferential surface of any one of the tube passing holes 11, a second end of the connecting portion 13 is integrally secured to another one of the tube passing holes 11 adjacent to the any one of the tube passing holes 11, whereby two tube passing holes 11 are connected to each other.

Furthermore, one of the connecting portions 13 and another one of the connecting portions 13 intersect each other such that the connecting portions 13 are integrally secured to each other.

In other words, adjacent tube passing holes 11 are connected to each other by the connecting portions 13, whereby two connecting portions 13 intersect each other at an intersection, and thus the two connecting portions 13 are integrally secured to each other.

Furthermore, the tube passing holes 11 and the connecting portions 13 are formed to have the same thickness on the same horizontal plane.

In other words, the tube passing holes 11 and the connecting portions 13 have the same thickness, such that the hydrogen storage materials 30 provided at opposite sides of the heat conduction fin 10 are in close contact with the tube passing holes 11 and the connecting portions 13.

Furthermore, the heat conduction fin 10 has an annular-shaped connecting ring portion 15 provided at the edge thereof, and the connecting portions 13 are connected to the inner circumferential surface of the connecting ring portion 15.

In other words, the connecting ring portion 15 is formed in an annular shape and is in close contact with the edges of the hydrogen storage materials 30, whereby heat is stably transferred even to the edges of the hydrogen storage materials 30.

Furthermore, the heat conduction fin 10 has a hydrogen injection portion 17 formed at the center thereof, and the connecting portions 13 are connected to the outer circumferential surface of the hydrogen injection portion 17.

As described above, the present disclosure is characterized in that the tube passing holes 11 are connected to each other by the linear-shaped connecting portions 13, while the connecting portions 13 are connected to each other in various directions between the tube passing holes 11. This makes it possible to reduce the weight of the heat conduction fin 10 while inhibiting heat conduction performance thereof from being degraded, thus reducing the weight of a hydrogen storage system. Additionally, the hydrogen storage materials 30 are provided in the empty spaces formed in the heat conduction fin 10, making it possible to increase the amount of the hydrogen storage materials 30 in the hydrogen storage system and thus increasing hydrogen storage capacity.

Although the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A heat conduction fin of a solid state hydrogen storage device having heat exchange tubes, the heat conduction fin comprising:

multiple tube passing holes through which the heat exchange tubes are configured to pass; and multiple connecting portions connecting the multiple tube passing holes to each other, wherein the multiple connecting portions include:
first connecting portions each having a straight shape, and
second connecting portions each having a curved shape, and wherein the multiple tube passing holes are provided at the same radial position with respect to a center of the heat conduction fin and the second connecting portions are configured to connect the multiple tube passing holes to each other along a circumferential direction of the heat conduction fin.

2. The heat conduction fin of claim 1, wherein the multiple connecting portions that connect the tube passing holes to each other form closed spaces defined between adjacent connecting portions.

3. The heat conduction fin of claim 2, wherein the heat conduction fin is disposed between hydrogen storage materials; and the hydrogen storage materials are provided in the closed spaces.

4. The heat conduction fin of claim 1, wherein ends of the multiple connecting portions are integrally secured to outer circumferential edges of the tube passing holes.

5. The heat conduction fin of claim 1, wherein among the multiple connecting portions, one connecting portion and another connecting portion intersect each other so as to be integrally secured to each other.

6. The heat conduction fin of claim 1, wherein the multiple tube passing holes and the multiple connecting portions are provided on a common horizontal plane.

7. The heat conduction fin of claim 6, wherein a material of the heat conducting fin forming the multiple tube passing holes has a thickness equal to a thickness of the material forming the multiple connecting portions.

8. The heat conduction fin of claim 1, further comprising:

a connecting ring portion having an annular shape provided at an edge of the heat conduction fin, wherein the first connecting portions are connected to an inner circumferential surface of the connecting ring portion.

9. The heat conduction fin of claim 1, further comprising:

a hydrogen injection portion provided at a center of the heat conduction fin, wherein the first connecting portions are connected to an outer circumferential surface of the hydrogen injection portion.

* * * * *